Sept. 30, 1969　　　W. B. LEWIS ET AL　　　3,470,408
VARIABLE RELUCTANCE ELECTRIC GENERATORS WITH
STACKED PERMANENT MAGNET DISCS
Filed Sept. 18, 1967　　　　　　　　　　3 Sheets-Sheet 1

INVENTORS
WILFRID B. LEWIS, WILLIAM A. WOLFE

By Stevens, Davis, Miller & Mosher
ATTORNEYS

INVENTORS
WILFRID R. LEWIS, WILLIAM A. WOLFE

Stevens, Davis, Miller & Mosher
ATTORNEYS

CIRCUMFERENTIAL DIRECTION

LONGITUDINAL DIRECTION

INVENTORS
WILFRID B. LEWIS, WILLIAM R. WOLFE

ATTORNEYS

United States Patent Office 3,470,408
Patented Sept. 30, 1969

3,470,408
VARIABLE RELUCTANCE ELECTRIC GENERATORS WITH STACKED PERMANENT MAGNET DISCS
Wilfrid B. Lewis and William A. Wolfe, Deep River, Ontario, Canada, assignors to Atomic Energy of Canada Limited, Ottawa, Ontario, Canada
Filed Sept. 18, 1967, Ser. No. 668,344
Int. Cl. H02k 19/24
U.S. Cl. 310—168                     5 Claims

ABSTRACT OF THE DISCLOSURE

Electric inductor generators of the magneto type having a rotor and a stator. A series of annular ferrite magnets arranged coaxially side-by-side (on a rotor or on an inner stator) have an associated magnetic structure including series of teeth that act as pole pieces for the magnets. Circumferentially extending coils extend around the outside of the generator structure. Located radially intermediate the teeth and the coils, and arranged to be rotatable relative to the teeth are magnetic shorting members that continuously switch the magnetic flux back and forth between a first condition in which it ideally does not link at all with an associated coil and a second condition in which it ideally fully links with such coil, thus generating a voltage therein. Longitudinally of the machine the shorting members are circumferentially staggered to generate a multiphase output in the coils.

---

This invention relates to an electric inductor generator of the magneto type.

While this type of generator is especially suited to the generation of very high voltages and this is the main application foreseen for the present invention, the principles underlying the invention are equally applicable to machines for generating lower voltages, and consequently the description and claims that follow are not limited to any specific voltage generation.

A generator according to the present invention will generate an alternating current, although not necessarily one having a perfect sine wave form. Where a direct voltage is required, the generator can be associated with a known rectifying and smoothing circuit for providing a direct voltage, and, if desired, various stages of the machine may be connected in cascade in order to achieve a high value for this direct voltage.

Conveniently the generator may be designed to produce a relatively high frequently, e.g., in the range of 5,000 to 6,000 Hz., and various stages of the generator can be arranged in a staggered phase relationship to each other to provide a multi-phase system. For the purposes of the specific description below, a three-phase system has been assumed, although greater efficiency (and a smoother output, when a direct voltage is the ultimate aim) may be obtainable with one of still more phases, e.g., a twelve-phase system.

In its broad scope the invention may be defined as an electric generator of the magneto type comprising (a) a rotor structure defining an axis,
(b) a stator structure, including means for supporting said rotor structure rotatably about said axis with at least one air gap between said structures,
(c) a coil of circumferentially extending turns forming part of said stator structure,
(d) an annular permanent magnet of high coercivity ferrite material mounted on a first of said structures coaxially with said axis,
(e) a magnetic structure forming part of said first structure and connected to said permanent magnet, said magnetic structure defining two circumerentially extending series of radially projecting teeth, the teeth of said two series being axially aligned with each other to form a series of pairs of pole pieces for the magnet flux generated by said magnet,
(f) and a series of magnetic switching means mounted circumerentially around the second of said structures at a location radially intermediatae said coil and said teeth for cooperation with and rotation relative to said teeth for periodically switching said flux back and forth between a short circuit condition in which said flux traverses said switching means substantially without linking with said coil and a further condition in which said flux traverses a path linking with said coil whereby to generate a voltage in said coil.

The accompanying drawings illustrate, by way of example only, two embodiments of the present invention, and also serve to explain the functional and structural differences between the present invention and the prior art.

Figure 9:
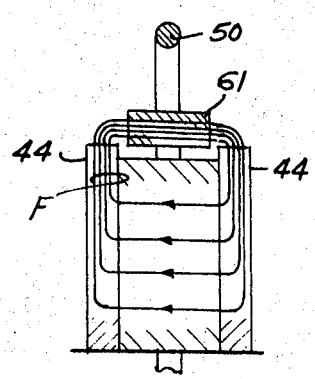
Figure 10:
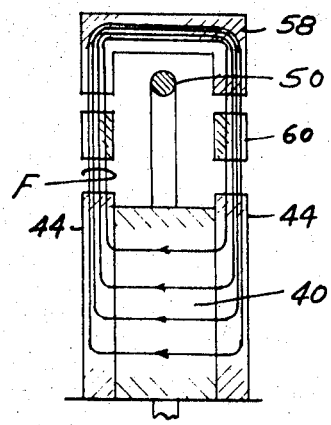
Figure 11:
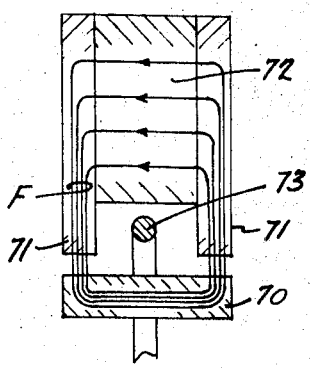
Figure 12:
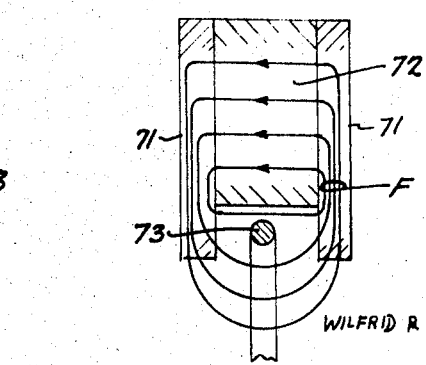
Figure 6:
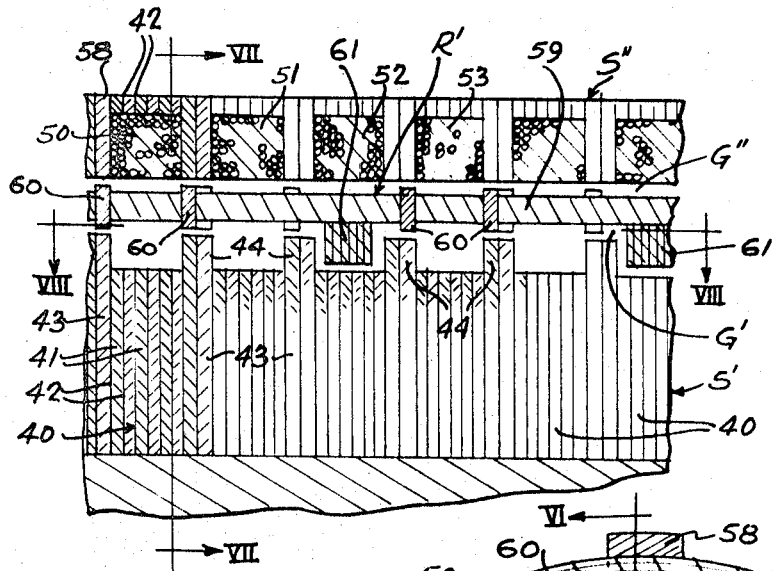
FIGURE 6 is a longitudinal section of a fragment of a second generator according to the present invention taken on the line VI—VI in FIG 7.
Figure 7:
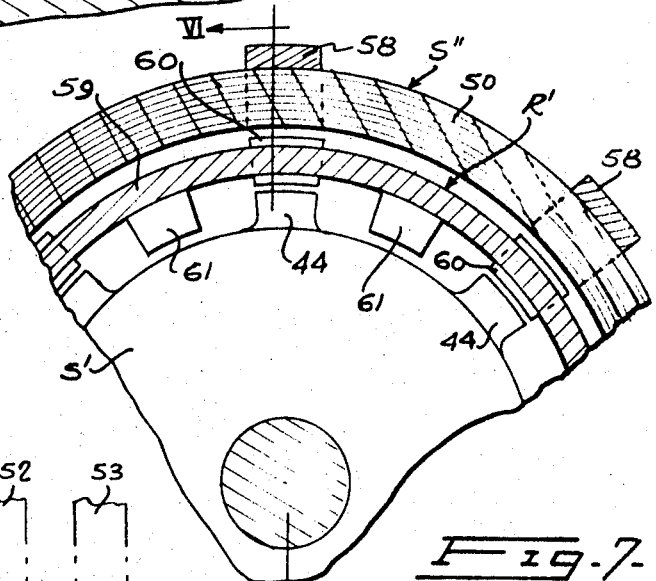
FIGURE 7 is a transverse section of this second generator taken on the line VII—VII in FIGURE 6.

FIGURES 9 and 10 are very diagrammatic fragments of FIGURE 6 demonstrating two operational conditions; and FIGURES 11 and 12 are views similar to FIGURES 4 and 5, and 9 and 10, of a prior art machine, serving to demonstrate the differences of the present invention therefrom.

Reference will first be made to the first form of generator illustrated in FIGURES 1 to 5. The machine shown in these figures consists of a stator S surrounding a rotor R across a gap G. The rotor R which is symmetrical about the axis A consists of a shaft 10 on which are mounted a series of annular permanent magnets 11 made of barium or strontium ferrite, these being materials of very high coercivity. Each magnet is built up from thin magnetic disks separated by electrically insulating sheets. As demonstrated in FIGURE 1, the magnets 11 are arranged with their polarities back to back, and between the magnets there is provided a magnetic structure in the form of soft iron spacers 12 that terminate in a series of radially outwardly projecting rotor teeth 13 that function as magnetic pole pieces. The teeth 13, as well as being aligned with each other to form a circumferential seires, as shown in FIGURE 2, are also aligned with each other in rows longitudinally of the machine. A non-magnetic material 14 consisting of a mixture of insulating fibreglass and epoxy resin is located between the teeth 13, as shown in FIGURE 1.

The stator S consists of a number of stator coils 20 to 25, each coil consisting of a number of circumferentially extending turns insulated from one another. Each coil 20 to 25 is located in a cavity in a tube 26 of insulating material that forms the body of the stator.

Secured to the inside surface of the tube 26 are a plurality of elongated magnetic switching members 30 to 36 made of a material having a relatively high magnetic permeability while at the same time constituting an electrical insulator. It will be noted that each of the members 30 to 36 is arranged to bridge, at some time or other, pairs of axially aligned teeth 13 of a pair of side-by-side circumferential series of such teeth, and moreover that the members 30 to 36 are arranged in a three-phase, staggered arrangement. For example, with the parts in the position shown in the drawings, the member 30 bridges a pair of rotor teeth 13a' and 13b' of teeth series 13a and 13b. After the rotor has turned a distance equal to a third of the spacing between adjacent rotor teeth, the next member along the stator, i.e. the member 31, will be in bridging alignment with the teeth 13b' and 13c', and so on. It will be noted that the circumferential spacing between aligned members, e.g. between members 30 and 34, is equal to the circumferential spacing between the rotor teeth 13. Thus, for any one given pair of circumferential series of teeth, e.g., series 13a and 13b, all the rotor teeth of these series are bridged simultaneously.

Figure 1:
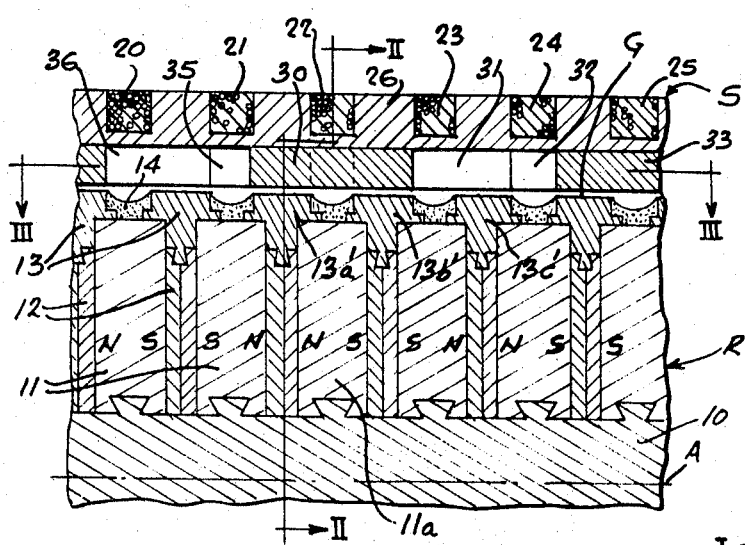
FIGURE 1 is a longitudinal section of a fragment of a first generator according to the present invention taken on the line I—I of FIGURE 2.
Figure 2:
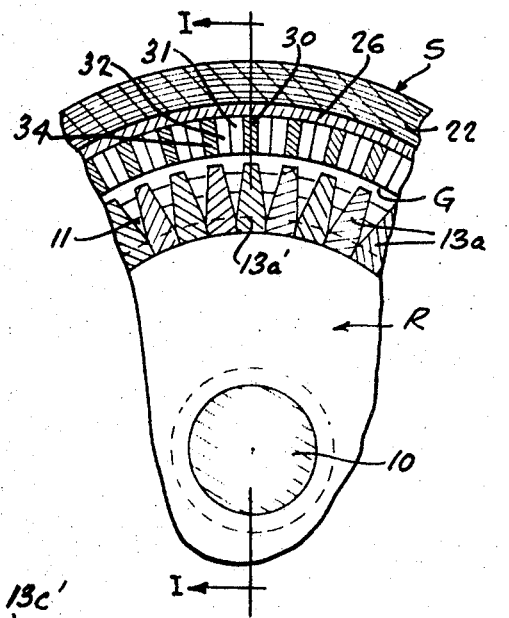
FIGURE 2 is a section taken on the line II—II in FIGURE 1.
Figure 3:
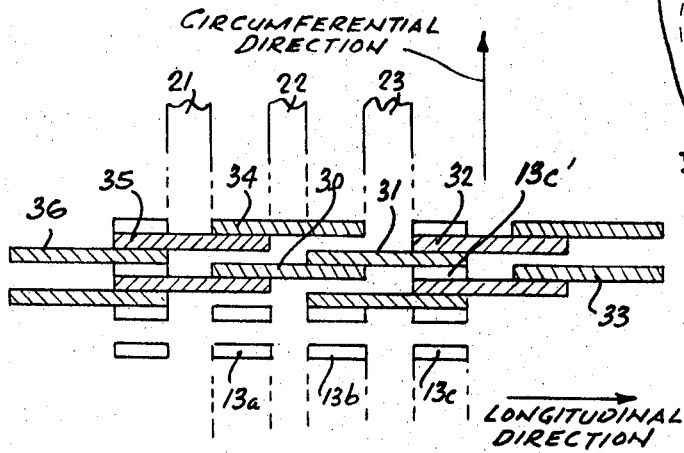
FIGURE 3 is a somewhat diagrammatic, developed section taken on the line III—III in FIGURE 1, but also showing other parts for clarification.
Figures 4, 5:
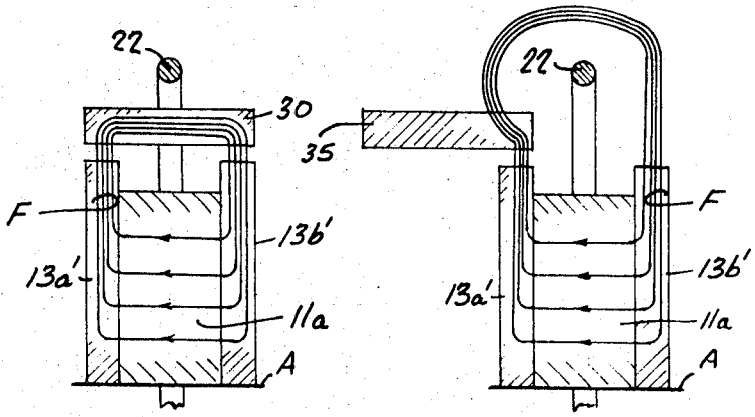
FIGURES 4 and 5 are very diagrammatic fragments of FIGURE 1 demonstrating two operational conditions.

At the moment when the situation illustrated in FIGURE 1 exists i.e., with the teeth of series 13a and 13b bridged by switching members, such as 30 and 34, the flux F of the magnet 11a is theoretically entirely short-circuited through such member, as demonstrated by the diagram of FIGURE 4. In theory none, and in practice relatively little of this flux escapes up to cut the coil 22. Conversely, when the members 30, 34 etc. have moved circumferentially, so as no longer to be in radial alignment with the teeth series 13a and 13b, this magnetic short circuit will cease to exist and the flux F from the magnet 11a will tend to fan out upwardly through the stator S and pass outside the coil 22 (FIGURE 5). To some extent it may also cut the adjacent coils 21 and 23. This outward expansion and subsequent contraction of the flux, which is continuously repeated, is equivalent to the flux cutting the coil 22 transversely to its turns, and thus generates a voltage therein. It will be noted that a flux contraction takes place each time the members in the circumferential row represented by the members 30 and 34 come into alignment with rotor teeth series 13a and 13b. By virtue of the staggered arrangement of the members 30, 31 and 32, for example, the same thing will be happening in the two adjacent phases in a 120° phase relationship.

The overall effect can be considered as a switching back and forth along the rotor of an expanding and contracting magnetic flux, the result being generation of an alternating current in a first phase in coils 20 and 23; in a second phase in coils 21 and 24; and in a third phase in coils 22 and 25.

Reference will now be made to the alternative embodiment of FIGURES 6 to 10. This machine has a tubular form of rotor R' which is arranged to be rotated on end bearings (not shown) in an annular space between the two parts of a stator structure namely an inner stator S' and an outer stator S'', thus defining two air gaps G' and G''. The inner stator S' consists, as before, of annular barium or strontium ferrite magnets 40 arranged magnetically back to back, each of these magnets 40 being built-up from a series of thin magnet discs 41 with thin electrically insulating sheets 42 arranged between them. Similar insulating sheets 42 are employed throughout the whole stator structure. This manner of construction is particularly adapted to the avoidance of spark over in high voltage machines. A magnetic structure in the form of soft iron spacers 43 is again provided between adjacent magnets 40, these spacers 43 terminating in projecting teeth 44 generally similar in function to the teeth 13 of the first machine.

The outer stator S'' consists of a series of coils 50, 51, 52, 53 etc. around each of which an external magnetic shunt 58 is arranged at each location opposite a longitudinally extending row of stator teeth 44.

The rotor R' is a tube 59 of electrically insulating material that carries two different types of members for switching the magnetic circuits. Firstly, is has secured to its sets of pairs of bridging members 60, which, when aligned with a longitudinal row of teeth 44 and associated shunts 58 (see FIGURES 7 and 10) have the effect of substantially completing a magnetic circuit for flux F from one such tooth 44, through one of the members 60, around the associated shunt 58 and back through the other member 60 to the next tooth 44. As demonstrated by FIGURE 7, the arrangement is such that the circumferential spacing betwen pairs of members 60 corresponds to the circumferential spacing between the teeth 44, so that in any given circumferential series the same conditions pertain the entire way around the machine.

Circumferentially intermediate respective pairs of members 60 there are located on the rotor tube 59 a seires of shunt switching members 61 which project into the space between respective pairs of teeth 44 of a longitudinally extending row of such teeth, in the manner best appreciated from FIGURES 6 and 9. It will be appreciated that, when a member 61 is thus aligned between a pair of stator teeth 44, it has the effect of a magnetic short circuit, so that theoretically virtually no flux then links with the associated coil.

Figure 8:
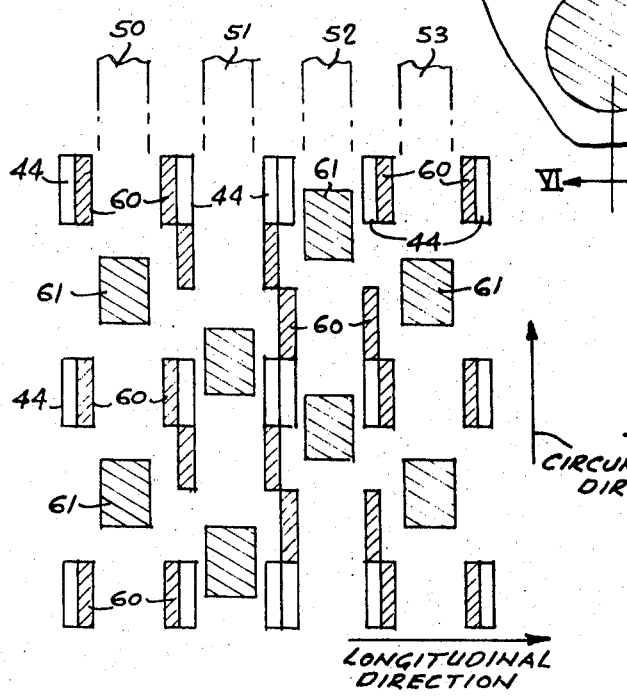
FIGURE 8 is a somewhat diagrammatic, developed section taken on the line VIII—VIII in FIGURE 6, but also showing other parts for clarification.

As can best be visualized from FIGURE 8, as the rotor R' rotates firstly all the members 60 are aligned with the stator teeth 44 of a given circumferential series (the series beneath the coil 50 in FIGURE 8); then all the members 61 are located between these same stator teeth; and so on. The adjacent circumferential series of members 60 and 61, i.e., those aligned with coils 51 and 52, for example, are staggered in a three-phase relationship. The flux linking each of the coils 50 to 53 etc. thus periodically expands and contracts, moving between the conditions of FIGURES 9 and 10 to induce an alternating current in each coil, the currents in successive coils bearing a three-phase relationship to each other.

A form of generator is already known from G. R. Polgreen British Patent No. 933,925 published Aug. 14, 1963, in which a series of rotating shunt bars mounted on a rotor cooperate with fixed circumferentially extending series of teeth on a stator, to switch a flux back and forth. FIGURES 11 and 12 demonstrate diagrammatically the action of the Polgreen machine in which a shunt bar 70, when aligned with a pair of teeth 71, shunts flux F from a magnet 72 (FIGURE 11) and, when circumferentially displaced out of alignment (FIGURE 12), allows the flux to spread out in its travel between the teeth 71. The coil 73 is fixed to the stator structure and lies above the shunt bars 70.

It will be observed that in both embodiments of the present invention, the flux is shorted between the pole pieces (FIGURE 4 or 9) in such a way as not to cut the coil (22 or 50) at all. Thus, under this first condition, there is ideally zero flux linking with the coil. In the other condition, the maximum flux links with the coil 22 (FIGURE 5) or with the coil 50 (FIGURE 10). By contrast, in the Polgreen construction, maximum flux links with the coil 73 when the shunt bar 70 is aligned (FIGURE 11). In the other condition (FIGURE 12), the magnitude of the flux has been decreased, by an increase in the reluctance of the circuit, but it still continues in the main to link with the coil 73. Thus, while the prior Polgreen construction is essentially one in which the voltage is generated by varying the magnitude of a flux that substantially links at all times with the coil, the constructions of the present invention are essentially ones in which the voltage is generated by the flux being switched back and forth between conditions of linking and non-linking with the coil. There will be some change in flux magnitude between the two conditions, more particularly in the embodiment of FIGURES 1 to 5, but this is a secondary aspect of less importance than the primary feature of switching back and forth.

This latter feature of switching the flux should at least be as efficient as that of the prior machine and moreover make possible a more suitable machine, i.e., a long machine with a minimum diameter, for the generation of high voltage. This shape is most suitable for the insulation of the high voltage from ground. Moreover, because of a better surface area-to-volume ratio in these arrangements, the removal of heat from the machine is less difficult than in that of Polgreen's.

We claim:
1. An electric generator of the magneto type comprising
   (a) a rotor structure defining an axis,
   (b) a stator structure, including means for supporting said rotor structure rotatably about said axis with at least one air gap between said structures,
   (c) a coil of circumferentially extending turns forming part of said stator structure,
   (d) an annular permanent magnet of high coercivity ferrite material mounted on a first of said structures coaxially with said axis,
   (e) a magnetic structure forming part of said first structure and connected to said permanent magnet, said magnetic structure defining two circumferentially extending series of radially projecting teeth, the teeth of said two series being axially aligned with each other to form a series of pairs of pole pieces for the magnet-flux generated by said magnet,
   (f) and a series of magnetic switching means mounted circumferentially around the second of said structures at a location radially intermediate said coil and said teeth for cooperation with and rotation relative to said teeth for periodically switching said flux back and forth between a shirt circuit condition in which said flux traverses said switching means substantially without linking with said coil and a further condition in which said flux traverses a path linking with said coil whereby to generate a voltage in said coil.

2. An electric generator according to claim 1, including a further series of magnetic means mounted around said second structure circumferentially intermediate said magnetic switching means, said further magnetic means being constructed to form magnetic continuations of said teeth to facilitate said flux linking with said coil in said further condition.

3. An electric generator according to claim 1, wherein said first structure forms part of said rotor structure and said second structure forms part of said stator structure.

4. An electric generator according to claim 1, wherein said stator structure is formed in two portions being a radially inner first portion and a radially outer second portion, said rotor structure comprising a cylindrical sleeve structure mounted between said portions; wherein said first structure is mounted on said first portion of the stator structure and said coil is mounted on said second portion of the stator structure; and wherein said second structure forms part of said rotor structure.

5. An electric generator according to claim 1, comprising a plurality of said annular permanent magnets disposed side-by-side axially along said first structure; said magnetic structure including pairs of said teeth axially aligned with each other on each side of each said magnet; and a plurality of said coils, each coil radially aligned with a respective one of said magnets; said magnetic switching means comprising a plurality of sets of magnetic switching elements with each set of said elements spaced out circumferentially around said second structure and with said sets spaced axially of each other along said second structure, the elements of adjacent sets being circumferentially offset from each other in order that the voltages induced in respective coils will bear a multiphase relationship to each other.

References Cited
UNITED STATES PATENTS

| | | | |
|---|---|---|---|
| 2,760,093 | 8/1956 | Button | 310—155 |
| 2,797,346 | 6/1957 | Ranseen | 310—46 |
| 3,237,036 | 2/1966 | Konig | 310—266 |
| 3,248,584 | 4/1966 | Knaver | 310—266 X |
| 3,293,460 | 12/1966 | Iwai et al. | 310—49 |

FOREIGN PATENTS

| | | |
|---|---|---|
| 933,925 | 8/1963 | Great Britain. |
| 972,364 | 10/1964 | Great Britain. |

WARREN E. RAY, Primary Examiner

U.S. Cl. X.R.

310—67, 112, 155, 156, 190, 266, 268